United States Patent [19]
Lin et al.

[11] Patent Number: 5,572,578
[45] Date of Patent: Nov. 5, 1996

[54] EXCHANGE OF INFORMATION BETWEEN INTERCONNECTED VOICE MAIL SYSTEMS

[76] Inventors: Frank C. H. Lin, 12056 Jamestown ct., Saratoga, Calif. 95070; Tzerng-Hong Lin, 579 Clauser Dr., Milpitas, Calif. 95035; Michael Chen, 1055 N. Capitol Ave. #160, San Jose, Calif. 95133; Samir Dharia, 2850 Alwood Ct., San Jose, Calif. 95148

[21] Appl. No.: 508,838

[22] Filed: Jul. 28, 1995

Related U.S. Application Data

[63] Continuation of Ser. No. 158,006, Nov. 26, 1993, abandoned.

[51] Int. Cl.⁶ .............................. H04M 3/50; H04M 7/00
[52] U.S. Cl. .............................. 379/89; 379/207; 379/235
[58] Field of Search .................................. 379/67, 88, 89, 379/84, 201, 207, 229, 235

[56] References Cited

U.S. PATENT DOCUMENTS

| 4,612,416 | 9/1986 | Emerson et al. | 379/88 |
| 4,790,003 | 12/1988 | Kepley et al. | 379/142 |
| 5,274,696 | 12/1993 | Perelman | 379/207 |

*Primary Examiner*—Jeffery Hofsass
*Assistant Examiner*—Fan Tsang
*Attorney, Agent, or Firm*—Elmer Galbi; Haverstock & Associates

[57] ABSTRACT

A voicemail message processing system. A voicemail message is sent to a remote recipient on a remote voicemail system. In response, the remote voicemail system sends an acknowledgment message containing information on the remote voicemail user. This information is stored for later use in addressing messages to the remote user, such as providing voice confirmations and address by name capabilities.

3 Claims, 3 Drawing Sheets

EXCHANGE OF INFORMATION BETWEEN INTERCONNECTED VOICE MAIL SYSTEMS

This application is a continuation of application Ser. No. 08/158,006 filed Nov. 26, 1993 which is now abandoned.

FIELD OF THE INVENTION

The present invention relates to voicemail systems and more particularly to the transfer of information among interconnected of voicemail systems.

BACKGROUND OF THE INVENTION

Voice mail systems generally provide voice mailboxes that are assigned to users. Callers can send recorded messages to a particular user's mailbox. A user can interrogate an assigned mailbox, obtain a count of the number of messages left by callers and retrieve any messages that have been left by callers.

For each user, that is for each mailbox, the system stores the owner's name in the owners voice. When a message is sent to a mailbox, the sender hears a digitized recording of the recipient stating his name. This voice confirmation assures the sender that he entered the correct or the intended voicemail address. Should the sender hear a different name or a different voice than he was expecting to hear, he can cancel the sending of the voicemail or re-enter the voicemail address.

Another feature of present day voice mail systems is a feature generally called Dial by name. Should someone desiring to send a message not know a local recipient's voicemail address, he can spell the recipient's name using the telephone keypad. The voicemail system searches for a match in its list of user profiles, and on finding one or more, the voicemail system lets the sender select the desired recipient.

In recent years computerized voicemail systems have come into widespread use. Voicemail systems are commercially available from a wide variety of companies including Octel Communications Corporation, VMX Inc., International Business Machines, and others. U.S. Pat. No. 4,371,752 (Matthews) and U.S. Pat. No. 4,761,807 describe early computerized voicemail systems.

Present day voicemail systems are often interconnected in networks. Messages can be sent to users connected to the local system as well as users connected to remote systems. With present systems, when a message is sent to a user on a remote system, the local system "out dials" to the remote system in order to send the message. This out dialing generally takes place some time after the message was sent or deposited in the system. Since the local system has no information concerning the users connected to remote systems, when a message is sent to a user on a remote system, the response which the sender hears is not the same as the response which the sender hears when a message is sent to a user on the local system. In particular the sender can not hear an acknowledgement in the voice of the intended recipient. Furthermore since the local system does not have information concerning users on remote systems, the dial by name facility is not available for remote users.

One way of solving this problem is for the local system to maintain a directory with information and a voice response for each user on each remote system on the network. Such a solution is technically feasible, but it requires a large amount of memory to store all the information and furthermore it introduces system administration problems since the directory on each system in a network must be updated whenever there is a change in the users on any system in the network.

The presents invention provides a solution to the problem of handling messages sent to users on remote systems and to the problem of dialing by name the users on remote systems.

SUMMARY OF THE INVENTION

The present invention operates on the assumption that most voicemail messages will be addressed to a relatively small subset of the many potential remote voicemail recipients. Each local system stores a limited number of records, or entries, of remote voicemail users in a network directory. Entries identifying remote users are made in the network directory whenever a local user sends a voicemail message to a remote recipient. When a remote voicemail system receives a message, the remote voicemail system sends an acknowledgment message. The acknowledgment contains the ASCII name of the recipient, the recipient's a spoken name, and the date the recipient's information last changed. This information is added to the sending voicemail system's network directory, and it is used to provide responses to senders when subsequent messages are addressed to that recipient.

The voicemail system uses the entries in the network directory in the same manner it uses the entries in its local user profiles to allow senders to dial by name and hear voice confirmations of any remote users contained in the network directory.

By maintaining a list of remote recipients in accordance with the present invention, much of the benefit of a complete list of remote users is gained using much less storage capacity.

Entries are removed from the network directory automatically when a remote voicemail system responds with an error message saying the intended recipient of a message is no longer at that voicemail address. Entries are also removed automatically when no voicemail has been addressed to their respective remote users for a fixed amount of time. When the network directory is becoming full, entries are automatically removed according to a least recently used algorithm.

A principal object of the present invention is to provide voice confirmation for voicemail messages addressed to remote recipients.

Another principal object of the present invention is to provide dial by name capabilities for voicemail messages addressed to remote recipients. Another object of the present invention is selectively store information on remote users of voicemail systems.

According to one aspect of the present invention, a voicemail message is sent to a remote recipient on a remote voicemail system. In response, the remote voicemail system sends an acknowledgment message containing information on the remote voicemail user. This information is stored for later use in addressing messages to the remote user, such as providing voice confirmations and address by name capabilities.

The foregoing and additional objects, features and advantages of the present invention will be more readily apparent from the following detailed description of preferred embodiments thereof which proceed with reference to the accompanying drawings.

DETAILED DESCRIPTION OF THE PREFERRED EMBODIMENT

Figure 1:
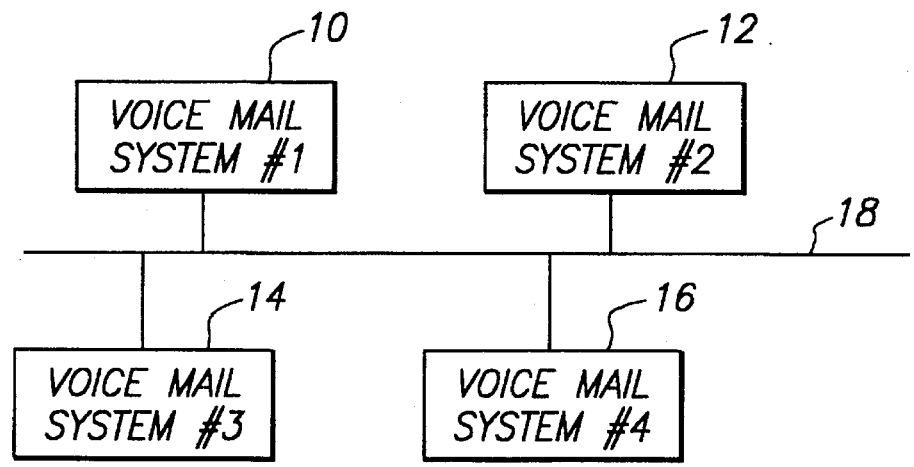
FIG. 1 is block diagram of a plurality of voicemail systems connected in a network.

FIG. 1 is a simplified block diagram showing four voicemail systems 10, 12, 14, 16. Each of the voicemail systems can answer a call, play a greeting, record a message and play back messages on demand. They can also send voicemail messages to other voicemail systems. The voicemail systems are connected to each other by a telephone line 18 which can be part of a standard telephone network. The telephone line 18 can be a telephone line which is part of a standard telephone network or a local area network (LAN) or a wide area network (WAN). In the preferred embodiment of the invention telephone line 18 is part of the public telephone network.

Each of the voicemail systems 10, 12, 14, 16 can be identical and can support a large number of voicemail users. Voicemail users on the same voicemail system are local to each other. For example, two voicemail users that have mailboxes on the first voicemail system 10 are local to each other. In contrast, two voicemail users that have mailboxes on different voicemail systems are remote from each other. Thus, a recipient of the second voicemail system 12 is remote from a sender on the fourth voicemail system 16. The diagram of FIG. 1 shows four voicemail systems; it will be recognized that less or more voicemail systems may be interconnected and use the present invention.

Figure 2:
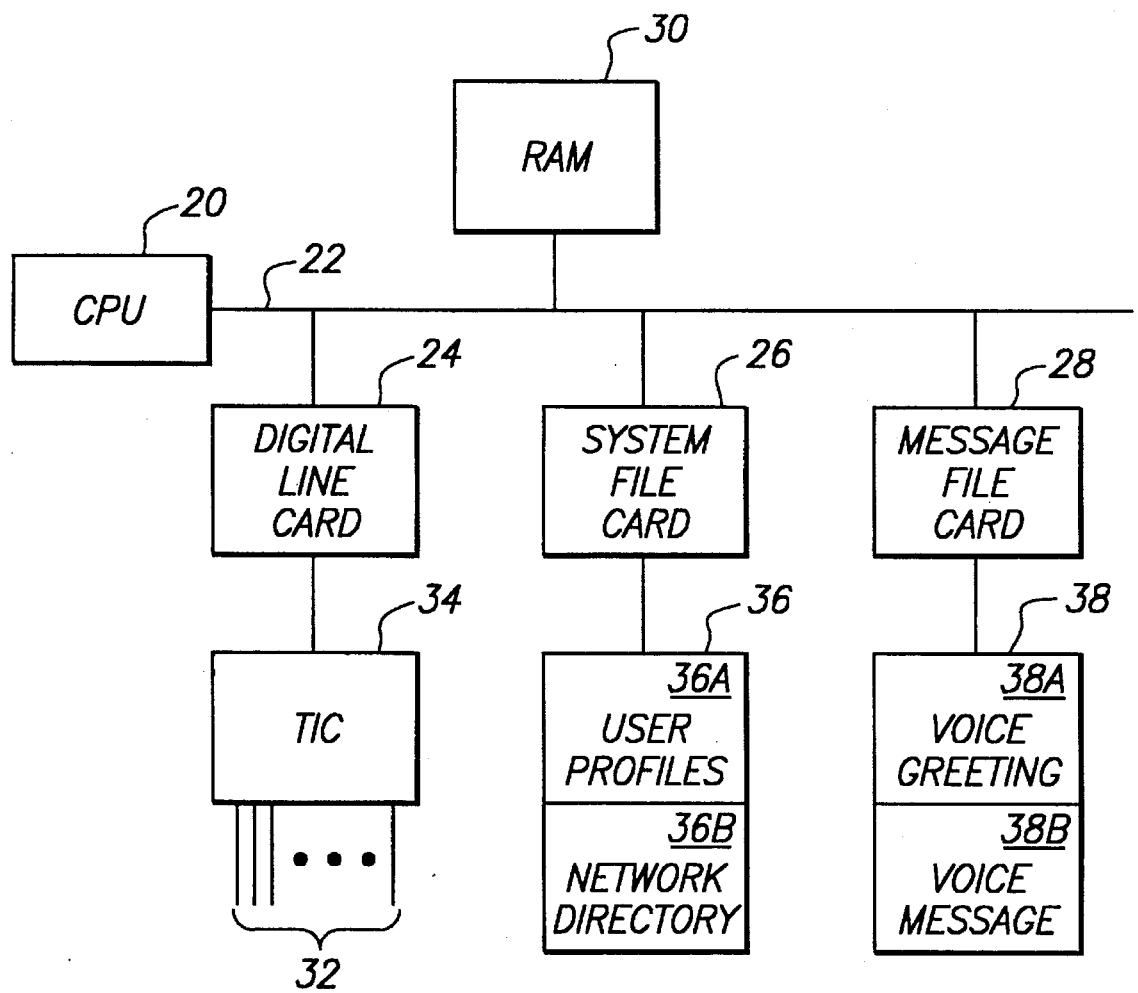
FIG. 2 is a block diagram of one of the voicemail systems shown in FIG. 1.

Referring now to FIG. 2, a single voicemail system 10 includes a central processing unit (CPU) 20 which may be a standard microprocessor such as an INTEL 80C386 microprocessor. Connected to a backplane bus 22 are a digital line card 24, a system file card 26, a message file card 28, and random access memory (RAM) 30. The backplane bus 22 is connected to the data bus of the CPU 20.

Input calls arrive at the voicemail system through input lines 32. These calls go through a Trunk Interface Card (TIC) 34 to the digital lines card 24 which digitizes the call and makes the data available on bus 22. The trunk interface card 34 and the digital lines card 24 are conventional.

The system file card 26 provides the CPU 20 with access to the disk memory 36 that contains user profiles 36A on local voicemail users and the network directory 36B. The message file card 28 provides the CPU 20 with access to the disk drive 38 that stores voice messages including the greetings 38A and the voice messages 38B that are left by callers.

The block diagram of FIG. 2 show separate disk drives 36, 38 and file cards 26, 28 for the system and message files, respectively. Other arrangements, such as a single file card and a single disk drive could provide the same functionality for the purposes of the present invention. The RAM 30 provides working space for the CPU 20 and temporary storage for information moving through the system. As shown in TABLE 1, a user profile or mailbox includes various information concerning a voicemail user and his mailbox. Of particular relevance to the present invention, a user profile contains the user's name in ASCII, the user's voicemail address, the user's class of service, and a timestamp. The timestamp changes whenever the local user's ASCII name or recorded voice changes. Other information also may be present in the user profile.

TABLE 1

USER PROFILE
LOCAL USER'S ASCII NAME
LOCAL USER'S VOICEMAIL ADDRESS
LOCAL USER's CLASS of SERVICE
TIMESTAMP - - DATE LAST CHANGED

Referring now to TABLE 2, the network directory 36B includes records containing information on remote users. Each record contains the remote user's name in ASCII, the remote user's voicemail address, a digitized copy of the remote user's spoken name, and a timestamp listing the number of days since the record was last accessed.

TABLE 2

NETWORK DIRECTORY ENTRY
REMOTE USER'S ASCII NAME
REMOTE USER'S VOICEMAIL ADDRESS
REMOTE USER's SPOKEN NAME
TIMESTAMP - - DAYS SINCE ACCESSED
TIMESTAMP - - DATE LAST CHANGED

Record entries in the network directory 36B may be either permanent or usage-based. The type of classification controls how the entries can be removed from the network directory.

Records can be added to the network directory 36B automatically and manually. In the former, the entries are automatically added whenever a local user sends a voicemail message to a remote user. In the latter, the voicemail administrator manually initiates the addition. When a user sends voicemail to a remote recipient, the remote system responds with an acknowledgment message. Referring now to TABLE 3, the acknowledgment contains the ASCII name of the recipient, the recipient's spoken name, and the date the recipient's information last changed. This information is then put in the network directory 36B, and will be used for subsequent voicemail messages to that recipient.

TABLE 3

ACKNOWLEDGMENT MESSAGE
RECIPIENT S ASCII NAME
RECIPIENT'S SPOKEN NAME
TIMESTAMP- -DATE LAST CHANGED

Figure 3:
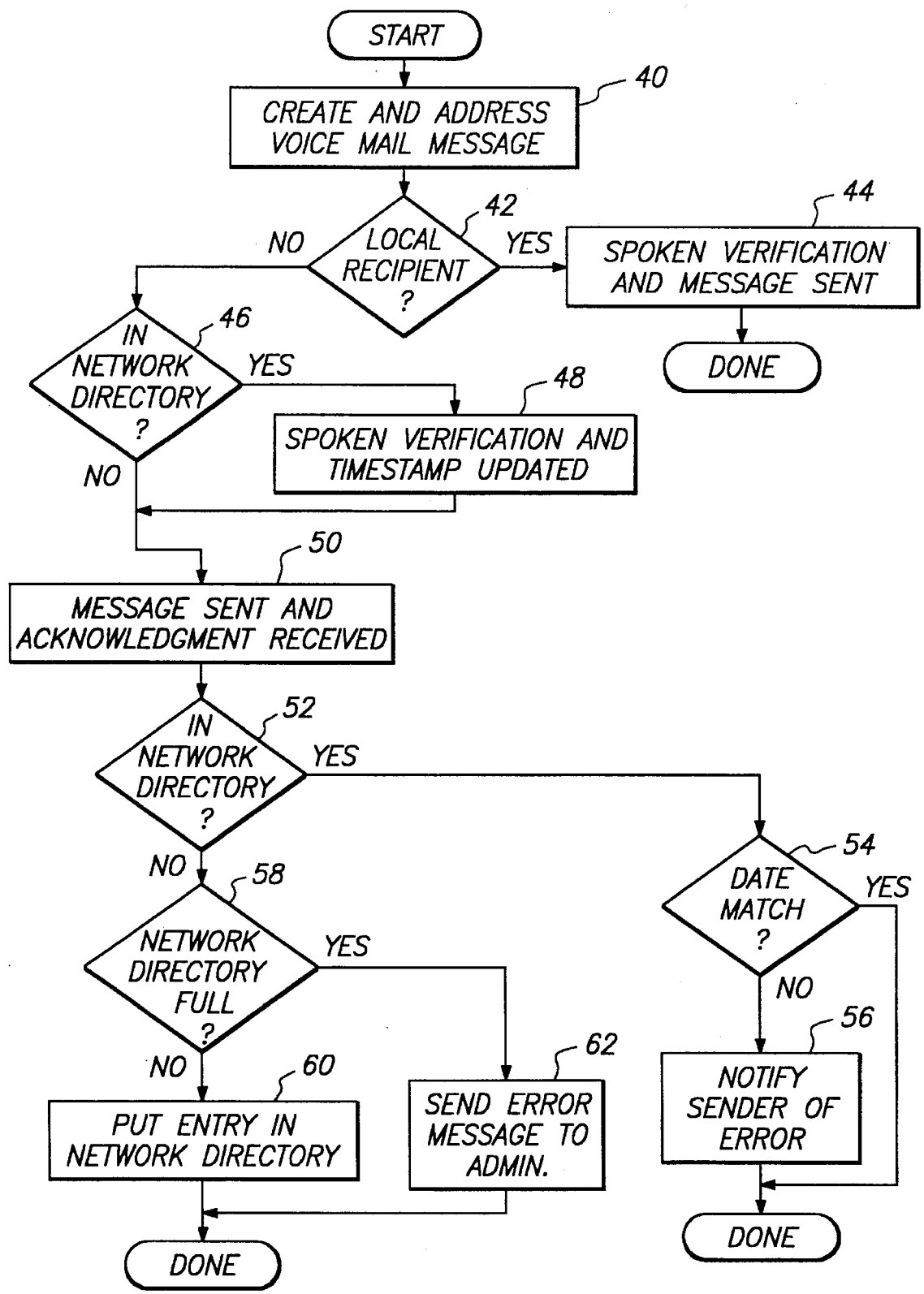
FIG. 3 is a flowchart of the steps performed in sending voicemail to a remote voicemail system.

Referring now to FIG. 3, a user creates a voicemail message and addresses it in step 40. If the recipient is a local voicemail user, as determined in step 42, the sender receives a spoken verification of the recipient's name and the message is sent as step 44.

If message is addressed to a remote recipient, the local voicemail system checks to see if there is an entry for the recipient in the network directory 36B as step 46. If the recipient is in the network directory, the sender receives a spoken verification and the recipient's timestamp in the network directory is updated as step 48.

Regardless of the results of the determination of step 46, the local voicemail system send the message to the remote system and receives an acknowledgment message as step 50. If the recipient is in the local system's network directory 36B, determined as step 52, the local system compares the acknowledgment's timestamp with the network directory's timestamp as stamp 54. If the dates do not match, either the recipient's name or voicemail address has changed, and the remote system could not deliver the message. In this case, the sender is notified of the failure, as step 56. If the recipient is not in the network directory 36B, and if the network directory is not full, which is checked in step 58, an entry is created for the recipient in the network directory as step 60. Otherwise, the voicemail administrator is sent an error message informing him of the status as step 62.

To manually add entries to the network directory 36B, the voicemail administrator creates a list of remote recipients for whom entries are to be added. The local system then sends a request for the ASCII name, voicemail address, spoken name, and timestamp for each of the remote recipients to their respective remote host systems. Each remote system responds with the requested information which is then place in the network directory 36B.

The manual addition of entries to the network directory 36B has essentially the same effect as if the voicemail administrator were to send a voicemail message to each of the remote recipients individually. However, the manual method does not require the administrator to create all the individual messages. Furthermore, the manual method allows the voicemail systems to recognize the process as lower priority than the transfer of normal voicemail, giving some flexibility in the timing of the operation should the voicemail systems be busy processing voicemail. Preferably, entries in the network directory 36B may be created as either permanent or usage-based. These two classifications affect how easily the entries may be removed from the network directory. Referring again to TABLE 1, each user profile contains a class of service code, or COS. The COS may be included in acknowledgment messages. If the COS indicates a permanent status, then the corresponding entry in the network directory 36B will also be permanent; otherwise, it will be usage-based.

To prevent a network directory 36B from becoming full with names no longer used, the network directory allows entries to be removed. Permanent entries in the network directory 36B may be manually removed by the voicemail administrator. They may also may be automatically removed when the local voicemail system receives a date mismatch between the network directory 36B and the acknowledgment message as determined in step 54 of FIG. 3, or when there is an ASCII name mismatch. This insures that messages will be delivered only to the correct recipient.

Furthermore, a voicemail system can send a message indicating a mailbox is no longer active and that all references to it in other system's network directories should be deleted.

Usage-based entries in a network directory 36B can be removed by all the methods used for permanent entries. They can also be aged out. That is, all entries in a network directory for which there have not been outgoing messages for a set period of time would be deleted.

Usage-based entries in the network directory 36B can also be removed on a least recently used basis when the network directory is becoming full.

Figure 4:
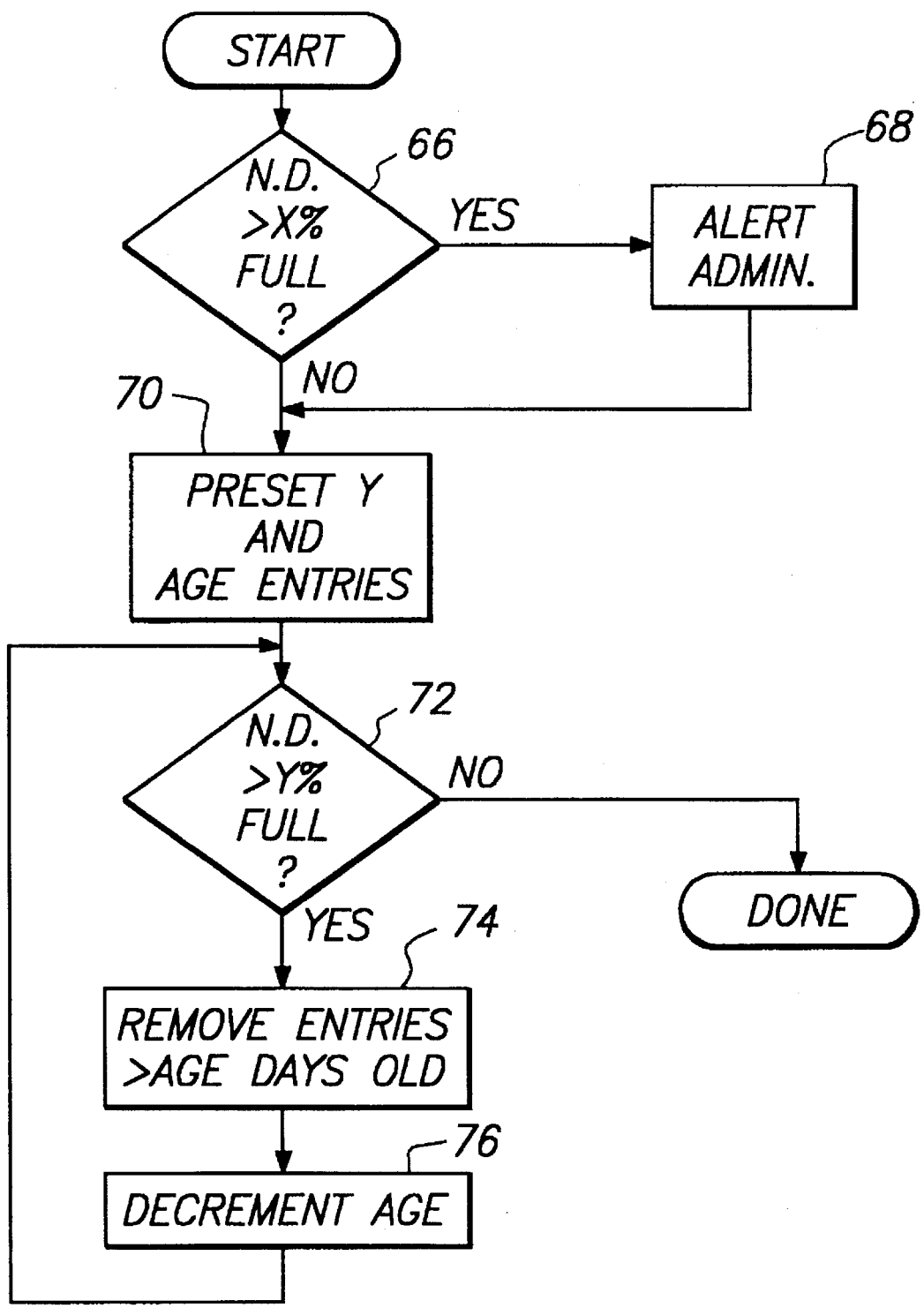
FIG. 4 is a flowchart showing the logic performed in automatically deleting records in a network directory.

Referring now to FIG. 4, a process to monitor and control the amount of spare capacity on the network directory 36B can be performed periodically, such as daily. As a first step 66, 68, the administrator would be alerted when the network directory exceeds a certain percentage X of utilization, such as 90 percent filled.

Furthermore, when a second, higher threshold Y has been exceeded, as determined by step 72, entries that have not been used for a preset amount of time would be deleted, as step 74. If the second threshold Y is still exceeded, the preset amount of time is repeatedly decreased in step 76 and records are purged until the threshold is no longer exceeded. The second threshold Y is preset in step 70.

As part of the process shown in FIG. 4, the timestamps of the entries in the network directory 36B are aged. A timestamp in a network directory entry indicates the number of days since a voicemail message has been addressed to that remote user. Once a day, the timestamp must be increased by one, and is shown as part of step 70. It will be recognized that this aging process need not be part of the routine that deletes network directory entries. It should, however, be performed once per day.

According to the present invention, when a user is addressing a voicemail message to a remote recipient, the voicemail system looks to the user profiles 36A and network directory 36B for addressing by name and for voice confirmation.

The terms and expressions that have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims that follow.

I claim:

1. A method for selectively storing information related to users of a remote voicemail system and using said information when a local user on a local voicemail system addresses a voicemail message to a user of a remote voicemail system, said local voicemail system including a storage device for storing said information related to users of a remote voicemail system said method comprising the steps of;

determining whether said storage device has stored therein said information on a particular user of a remote voicemail system, in response to a local user addressing a voicemail message to said particular user of said remote voicemail system;

if the storage device has stored therein said information on said particular user of said remote voicemail system, providing that information to the local user;

sending the voicemail message to the remote voicemail system whether or not the storage device has stored therein said information on said particular user;

receiving an acknowledgment message from the remote voicemail system, said acknowledgment message containing information on said particular remote voicemail user; and storing the information contained in said acknowledgment message using the storage device.

2. The method of claim 1, where the step of providing said information to the local user includes playing a recording of the name of the particular user of said remote voicemail system.

3. A method for selectively storing information related to users of a remote voicemail system and using said information when a local user on a local voicemail system addresses a voicemail message to a user of a remote voicemail system by spelling the name of the user of the remote voice mail system, said local voicemail system including a storage device for storing said information related to users of a remote voicemail system, the method comprising the steps of: determining whether said storage device has stored therein said information on a particular user of a remote voicemail system in response to a local user spelling said particular remote user's name; if the storage device has stored therein said information related to said particular remote user, using said information to address the voicemail message; and sending the voicemail message to the remote voicemail system whether or not said storage device has stored therein said information related to said particular user;

receiving an acknowledgment message from the remote voicemail system, the acknowledgment message containing information related to said particular user of said remote voicemail system; and updating said stored information using the information contained in the acknowledgment message.

\* \* \* \* \*